Figure 1:
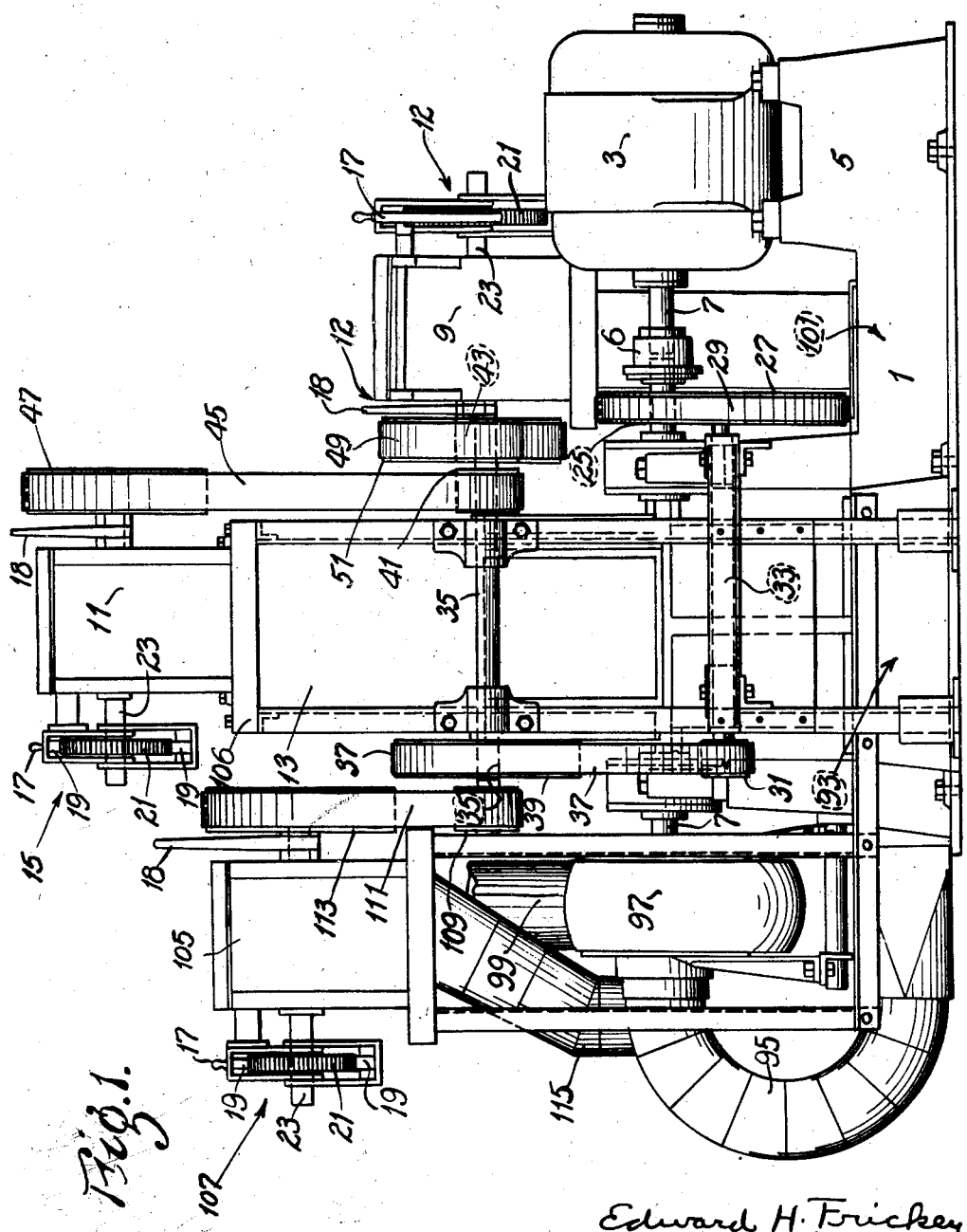

June 7, 1932.　　　E. H. FRICKEY　　　1,861,471
APPARATUS FOR THE MANUFACTURE OF PREPARED FEEDS
Filed Nov. 6, 1930　　　3 Sheets-Sheet 1

Fig. 2.

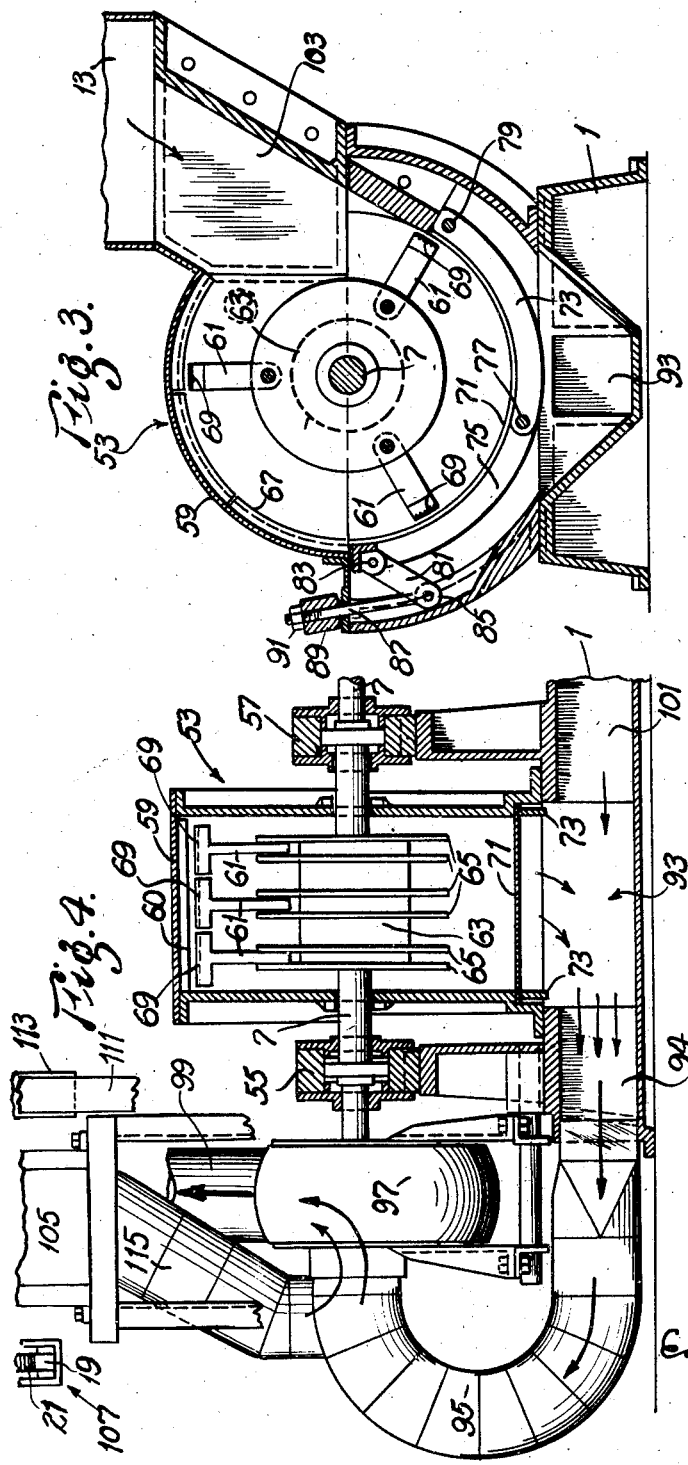

Patented June 7, 1932

1,861,471

UNITED STATES PATENT OFFICE

EDWARD H. FRICKEY, OF PASADENA PARK, MISSOURI, ASSIGNOR TO DIXIE MACHINERY MANUFACTURING COMPANY, OF ST. LOUIS, MISSOURI, A CORPORATION OF MISSOURI

APPARATUS FOR THE MANUFACTURE OF PREPARED FEEDS

Application filed November 6, 1930. Serial No. 493,716.

This invention relates to apparatus for manufacturing prepared feeds, and with regard to certain more specific features to a device wherein feed or grain from a grinder comprising a part of the apparatus is ground and mixed in predetermined proportions with grain or feed which does not pass through the grinder.

Among the several objects of the invention may be noted the provision of apparatus which will grind and mix a plurality of ingredients, so as to produce a prepared feed; the provision of apparatus of the class described in which a ground product, suitable for mixing in a prepared feed, is combined in predetermined proportions with feed ground in the apparatus itself; the provision of apparatus of the class described in which several feeding means and a grinder are combined into a machine which may be driven from a single power source; and the provision of apparatus of the class described which, though simple, is effective and permits of great flexibility in the preparation of a variety of prepared feeds. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

Figure 2:
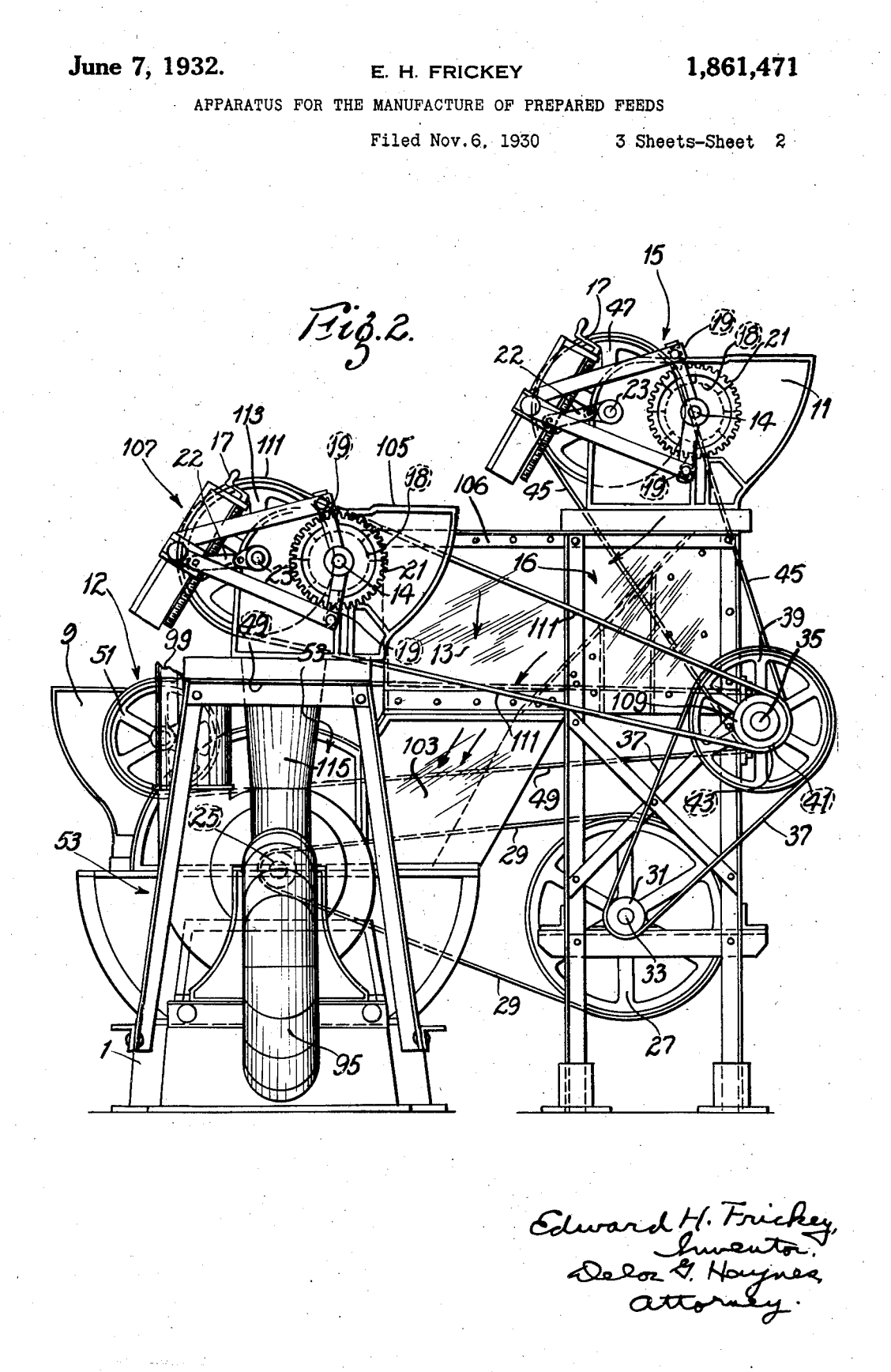

In the accompanying drawings, in which is illustrated one of various possible embodiments of the invention, Fig. 1 is a rear elevation of the apparatus;
Fig. 2 is a side elevation of the apparatus;
Fig. 3 is a cross-section; and,
Fig. 4 is a longitudinal section of the grinder, showing also a side elevation of a blower.

Similar reference characters indicate corresponding parts throughout the several views of the drawings.

Referring now more particularly to Fig. 1 there is illustrated at numeral 1 a base portion comprising a support for the apparatus. An electric motor 3 is mounted on a pedestal portion 5 of base 1 and is coupled to a driving shaft 7 by means of a flexible coupling 6. The shaft 7 extends from the coupling 6 throughout the entire length of the apparatus thus comprising a main shaft, which drives the component members of the assembly.

There are provided four means whereby the ingredients for a prepared feed may be fed into the apparatus. At numerals 9, 11 and 105 there are shown hoppers provided with conventional grain feeding mechanisms 12, 15 and 107, respectively, which are adapted to effect variations in rate of delivery and at 13 there is shown a hopper for receiving a fourth source of grain supply.

Referring to Fig. 2 it will be noted that the grain feeding mechanism 15 is associated with the hopper 11 into which the grain is admitted. The mechanism associated with the hopper is set out in United States Patent 1,369,968 for "feed-regulator", March 1, 1922, and in United States Patent 1,215,506 for "variable-speed mechanism", February 13, 1917, but a short description will be given for clarity. There is provided a series of buckets 18 peripherally mounted on a shaft 14 adapted to scoop up quantities of feed from hopper 11 and transfer this feed into a discharge passage 16. The speed of rotation of these buckets 18 may be regulated to a predetermined rate by means of an adjusting screw 17 which alters the stroke of a pair of pawls 19 engaging a gear 21, which gear 21 is mounted on the same shaft 14 with the buckets 18. Rotation of a shaft 23 by means of an eccentric 22 rocks the member carrying the screw 17 so as to impart a driving motion to the gear 21 by means of the pawls 19. A pulley 47 is in clutching engagement with shaft 23; a clutch handle 18 (Fig. 1) is provided as a controlling lever to throw the feeder into or out of driving connection with the motor 3. The grain feeders 12 and 107 for the hoppers 9 and 105, respectively comprise the same construction as the feeder 15.

A small pulley 25 mounted near the flexible coupling 6, on shaft 7 is belted to a larger pulley 27 by means of belt 29 and drives a similar small pulley 31 by means of the countershaft 33. Pulley 31 drives a jackshaft 35 by means of belt 37 and pulley 39. On jackshaft 35 there are also mounted three pulleys 41, 43 and 109. Pulley 41 supplies power to the hopper 11 by means of belt 45 and pulley 47 mounted on shaft 23; pulley 43 supplies power to the hopper 9 by means of belt 49 and pulley 51; and pulley 109 supplies power to the hopper 105 by means of belt 111 and pulley 113. It is thus seen that the motor 3 supplies the driving power for all the feeding mechanisms 12, 15 and 107. It is also clear that for a given motor speed the speeds of the feeding mechanisms may be independently varied by means of the adjusting screws 17.

The shaft 7 also drives a grinder represented at 53 (see Figs. 3 and 4). The shaft 7 is rotatably supported by means of the bearings 55 and 57. The grinder 53 is described in part in my United States Patent 1,759,448 issued May 20, 1930, for "grinder". The grinder proper includes a casing 59 enclosing a plurality of rotating crushers or beaters 61. A rotor 63, keyed to the shaft 7, carries a plurality of spacing supporting rings or discs 65. Near the peripheral edges of said rings 65 are provided means for oscillably mounting a plurality of crushers or beaters 61 which are provided with roughened surfaces 69. Within the casing 59 at the upper portion thereof there is provided an inner wall comprising a corrugated or roughened surface 67. The beater 61 and the roughened surfaces 67 and 69 cooperatively operate to crush the grain between their juxtaposed surfaces. These roughened surfaces do not come into actual contact but exert a crushing and grinding action on the grain therebetween.

Within the casing 59, and at the bottom portion thereof, there is provided a curved or substantially semi-circular screen 71, adapted to permit passage of the material which has been reduced to a proper degree of fineness, but adapted to retain coarser material, permitting it to be again forced around, either partially or completely, by the beaters 61, for grinding between the beater elements and the inner wall 67.

The supports for the screen 71 comprise a pair of grids 73, 75. The grids have curved or arcuate shapes adapted to hold the screen 71, which is also arcuately shaped so as to permit of rotating of the beaters 61. The grids are hinged together at a downward point 77 and the grid 73 is hinged within the casing 59 at a point 79.

The grids 73, 75 are held in a raised position by means of a link 81 pivoted to the upper end of the grid 75 at 83, said link 81 being also pivoted at 85 to a threaded link 87. The link 87 slidably passes through a sleeve 89 so that the threading down of nut 91, pulls the screen 71 closer to the edges of the rotating beaters 61. It is clear that adjustment of the nut 91 effects a change in the coarseness of the grain passing through the screen 71. When the screen 71 is drawn closer to the beater elements 61, more of the grain is forced around for further grinding and beating than when the screen is at a farther distance from the beater elements 61.

The inlet passage 103 of the grinder 53 (see Figs. 2 and 3) communicates with both the hoppers 13 and 11. The output from hopper 11 passes through the discharge passage 16 and into the hopper 13 before entering the inlet 103. The hopper 13 comprises substantially a closed bin into which ears of corn or other coarse grains are placed and is provided with a cover 106. Another source of grain or ingredient to be ground, is fed into the passage 103 from the hopper 11 by means of the feeder 15 and it is thus seen that the grinder 53 may simultaneously grind and mix two different kinds of grain and that the quantity of each kind may be separately varied. It is to be understood of course that either one or both of the hoppers 11 and 13 may be used. Therefore the material in passing through the screen 17 may comprise a mixture of two ingredients of predetermined amounts.

The grain passing through the screen 71 enters a discharge passage 93 contained within the base 1. This passage 93 communicates with an outlet passage 94. The outlet passage 94 communicates with a draft pipe 95 connected to a centrifugal suction blower 97. This suction blower 97 is mounted at the end of base 1 opposite motor 3 and is directly driven by means of the shaft 7.

The discharge passage 93 also communicates with a passage 101 which is a discharge passage for the hopper 9. It is thus clear that the grain coming from hopper 9 enters the passage 93 by means of the passage 101 and there meets the grain coming from the grinder 53 which mixture of three ingredients is in turn carried through the draft pipe 95.

To the mixture of three ingredients entering the draft pipe 95 from the outlet passage 94, there is added a fourth ingredient. This fourth ingredient comes from hopper 105 and is fed, by means of the feeding mechanism 107, into a discharge passage 115 communicating with the draft pipe 95, as shown in Fig. 1. It is thus clear that there is delivered at the output pipe 99, a mixture of four ingredients in predetermined proportions. Such a mixture of two or more ingredients is called a prepared feed.

It is thus clear that this apparatus performs the dual function of grinding and mixing whereby a more homogeneous prepared feed may be more economically made. It is also clear that the nature of the prepared feed may be of many different forms. The ingredients introduced into the hoppers 9 and 105 should be of a fineness that is desired in the final product. The ingredients introduced into the hoppers 11 and 13 may comprise varieties of grain of a coarseness greater than is desired in the final prepared feed. The degree of fineness to which these two ingredients is ground may be readily varied by adjusting the position of the screen 71 by means of the nut 91.

If a prepared feed comprising one or more ingredients to be ground and one added ingredient to be mixed with the other ingredients as they are ground is to be made by this apparatus, I have found it preferable to use the hopper 105 as the hopper for the added ingredient. Also if the apparatus is to be provided with a single hopper for feeding an ingredient to be mixed with other ingredients being ground, this hopper should be placed in substantially the position of hopper 105. The hopper 105 is better situated with respect to the blower 97 to handle heavier grains or ingredients than is hopper 9 and also insures a better flow for lighter grains.

It is clear that any of the hoppers not being used should be provided with a cover similar to cover 106 for hopper 13 so as to provide a stronger suction for the hoppers being used. Instead of a cover, however, any other suitable means may be used such as, for example, a damper inserted in the discharge passage of the hopper.

Although the apparatus as described shows four hoppers two of which communicate with the input passage of the grinder and two of which communicate with the discharge passage of said grinder, it is to be understood that the invention is not to be so limited. There may be provided a single hopper or a plurality of hoppers feeding the grinder and there may also be one or more hoppers feeding ingredients to be mixed with the material coming from the grinder. Also it is to be understood that the ingredients do not necessarily comprise grain; that the resulting prepared feed may comprise any number of ingredients greater than two; and that a mixture of ingredients as well as a single ingredient may be fed from any of the hoppers.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In apparatus of the class described, the provision of a grinder provided with an inlet and a discharge passage, a plurality of hoppers into which separate quantities of ingredients for a prepared feed may be introduced, said hoppers being provided with discharge passages communicating with the inlet passage of said grinder, a feeding mechanism associated with at least one of said hoppers, said feeding mechanism regulating the amount of the ingredient entering said grinder from said hopper, at least one hopper separate from said first-named hoppers, said hopper receiving an ingredient and being provided with a discharge passage communicating with the discharge passage of said grinder, said last-named ingredient being mixed with said first-named ingredients after said first-named ingredients are ground to a predetermined fineness by said grinder.

2. In apparatus of the class described, the provision of a grinder provided with an inlet and a discharge passage, a hopper communicating with the inlet passage of said grinder, a hopper provided with a discharge passage, said discharge passage of said second hopper communicating with the discharge passage of said grinder, and a base for said grinder and said hoppers, said base being provided with an outlet passage, said outlet passage communicating with the discharge passage of said grinder.

3. In apparatus of the class described, the provision of a grinder provided with an inlet and a discharge passage, a hopper communicating with the inlet passage of said grinder, a hopper provided with a discharge passage, said discharge passage of said second hopper communicating with the discharge passage of said grinder, a suction blower, and a base for said grinder and said hoppers, said base being provided with an outlet passage, said outlet passage communicating with said blower and said discharge passage of said grinder.

4. In apparatus of the class described, a grinder provided with an input and a discharge passage, at least one hopper provided with a discharge passage communicating with the input passage of said grinder, at least two hoppers provided with discharge passages, said last-named hoppers being separate from said first-named hopper, and a suction blower provided with a draft tube, said draft tube communicating with all of said discharge passages.

5. In apparatus of the class described, a grinder provided with an input and a discharge passage, at least one hopper provided with a discharge passage communicating with the input passage of said grinder, at least two hoppers provided with discharge passages, said last-named hoppers being separate from said first-named hopper, and a suction blower provided with a draft tube, the discharge passages for one of said second-named hoppers communicating directly with said draft tube and the other discharge passage communicating with the discharge passage of said grinder, and said draft tube communicating with the discharge passage of said grinder.

6. In apparatus of the class described, a grinder provided with an input and a discharge passage, at least one hopper provided with a discharge passage communicating with the input passage of said grinder, at least one hopper provided with a discharge passage, said second hopper being separate from said first hopper, and a suction blower provided with a draft tube, said draft tube communicating with the discharge passage of said grinder, and the discharge passage of said second hopper entering said draft tube at a point between said blower and the discharge passage of said grinder.

In testimony whereof I have signed my name to this specification this 3rd day of November, 1930.

EDWARD H. FRICKEY.